United States Patent
Nakagawa

(10) Patent No.: US 10,672,196 B2
(45) Date of Patent: Jun. 2, 2020

(54) INFORMATION PROCESSING APPARATUS AND METHOD OF CONTROLLING AN INFORMATION PROCESSING APPARATUS THAT GENERATE, FOR DISPLAY, A COMPOSED IMAGE IN WHICH A COMPUTER GRAPHICS OBJECT IS OVERLAND ON A PORTION OF THE IMAGE

(71) Applicant: CANON KABUSHIKI KAISHA, Tokyo (JP)

(72) Inventor: Masashi Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/111,950

(22) Filed: Aug. 24, 2018

(65) Prior Publication Data
US 2019/0066388 A1    Feb. 28, 2019

(30) Foreign Application Priority Data
Aug. 31, 2017    (JP) .................. 2017-167663

(51) Int. Cl.
G06T 19/00    (2011.01)
G06T 19/20    (2011.01)
G06T 17/20    (2006.01)
G06F 3/01    (2006.01)
G06F 3/041    (2006.01)
(Continued)

(52) U.S. Cl.
CPC .............. *G06T 19/20* (2013.01); *G06F 3/011* (2013.01); *G06F 3/0304* (2013.01); *G06F 3/042* (2013.01); *G06F 3/0416* (2013.01); *G06T 17/20* (2013.01); *G06T 19/006* (2013.01); *G06T 2200/04* (2013.01); *G06T 2200/08* (2013.01)

(58) Field of Classification Search
None
See application file for complete search history.

(56) References Cited

U.S. PATENT DOCUMENTS
9,767,611 B2    9/2017    Takemoto

FOREIGN PATENT DOCUMENTS
JP    2015-082288 A    4/2015
JP    2016-071645 A    5/2016

OTHER PUBLICATIONS

Gunther et al., "Aughanded Virtuality—The Hands in the Virtual Environment", IEEE, 2015. (Year: 2015).*
(Continued)

*Primary Examiner* — Nicholas R Wilson
(74) *Attorney, Agent, or Firm* — Venable LLP

(57) ABSTRACT

An information processing apparatus that communicates with a display device that has an image capturing unit and that generates an image to be displayed on the display device, a composed image in which a CG (Computer Graphics) object in a virtual space according to the position and orientation of the image capturing unit is overlaid on a portion of an image, in real space, captured by the image capturing unit. An image generating unit performs a contact determination between the CG object in the virtual space and an operation unit in the real space based on a thickness model generated by a thickness model generating unit, and generates, as an image to be displayed on the display device, the composed image to which the result of the contact determination is reflected.

9 Claims, 6 Drawing Sheets

(51) Int. Cl.
  *G06F 3/03* (2006.01)
  *G06F 3/042* (2006.01)

(56) References Cited

OTHER PUBLICATIONS

Melax et al., "Dynamics Based 3D Skeletal Hand Tracking", Graphics Interface Conference, 2013. (Year: 2013).*
Rhee, et al., "Human Hand Modeling from Surface Anatomy", In Proceedings of the symposium on Interactive 3D graphics and games, Mar. 14, 2006. (Year: 2006).*
Azernikov et al., "Surface Reconstruction of Freeform Objects Based on Multiresolution Volumetric Method", 2003. (Year: 2003).*
Lewis, J.P., et al., "Pose Space Deformation: A Unified Approach to Shape Interpolation and Skeleton-Driven Deformation," Proceeding of SIGGRAPH 2000, Jul. 2000, pp. 165-172.

* cited by examiner

INFORMATION PROCESSING APPARATUS AND METHOD OF CONTROLLING AN INFORMATION PROCESSING APPARATUS THAT GENERATE, FOR DISPLAY, A COMPOSED IMAGE IN WHICH A COMPUTER GRAPHICS OBJECT IS OVERLAND ON A PORTION OF THE IMAGE

This application claims the benefit of Japanese Patent Application No. 2017-167663, filed Aug. 31, 2017, which is hereby incorporated by reference herein in its entirety.

BACKGROUND OF THE INVENTION

Field of the Invention

The present invention relates to an information processing apparatus for modeling a specific real object from a captured image and a method of controlling an information processing apparatus that generate, for display, a composed image in which a computer graphics object is overlaid on a portion of an image.

Description of the Related Art

In recent years, research relating to mixed reality (MR), in which virtual space information is superimposed on real space in real time and presented to a user, is being conducted. In mixed reality, a composed image, in which a virtual space image (CG: Computer Graphics) according to the position and orientation of an image capturing device, such as a head mounted display (HMD), is overlaid on a portion or the entire area of an actual video captured by the image capturing device, is displayed.

At that time, a sense of distance between objects can be expressed by not displaying a virtual object in a specific real object area in an area of a captured image, depending on the distance of the real object from the virtual object. For example, when a real object such as a tool or a hand of the user himself who is wearing the HMD is held up in front of a virtual object, the hand or tool is displayed in front of the virtual object without the virtual object being drawn in the area of the hand or tool in the captured image. Accordingly, the user can more easily grasp the positional relationship between the virtual object and the real object, and it becomes easier to verify work that uses the actual hand or tool in the virtual space.

In this way, in order to correctly express the positional relationship between a real object and a virtual object, detection of the real object area and a measurement of the distance to the real object are necessary. However, even if the distance to the real object is measured by a distance measurement apparatus attached to the HMD, what is obtained is the distance between the surfaces of the HMD and the real object, and it is not possible to acquire the depth of the real object itself (the distance between the surface on the HMD side and the surface on the side opposite thereto). The result of this is that, even if the distance to the surface of the actual hand from the camera is measured in the case of performing a determination as to contact between the actual hand and the CG model in the mixed reality, there is a problem in that it is not possible to make a determination as to contact between the CG model and the back surface of a hand that is actually contacting it.

For example, Japanese Patent Laid-Open No. 2015-82288 (hereafter referred to as the '288 document) discloses a method in which, in a case when a depth estimation is made by cameras of a plurality of viewpoints, the depth of a point for which association between images cannot be made is estimated from the depth of points for which association is possible. Also, in "Pose space deformations. A unified approach to shape interpolation and skeleton-driven deformation. Proceedings of SIGGRAPH 2000", J. P. Lewis, Matt Corder, and Nickson Fong, pp. 165-172, July 2000 (hereafter referred to as the Lewis, et al. article), it is disclosed that thickness adding is performed for joints obtained by motion capture using a CG model of a body or a hand which is prepared in advance. Also, Japanese Patent Laid-Open No. 2016-71645 (hereafter referred to as the '645 document) proposes a method of restoring a three-dimensional model of a wide range including a side surface area and not just a front surface area based on a depth image.

However, while in the '288 document, it is possible to estimate depth in relation to an area for which matching between a plurality of cameras is not possible, it is not possible to estimate the depth of an area that cannot be seen by all of the cameras. Also, in the Lewis, et al. article, there is the problem that it is difficult to match the CG model and the position, thickness, or length of the real object when a model is reconstructed from joint positions, or the like, which are obtained by motion capture, and visible deviations in the mixed reality occur. Furthermore, the '645 document is premised upon the use of voxels, and there is a problem in that in the case of estimating the depth of a model at good precision, a large amount of memory and time is required for generation of the depth model if the resolution of the voxels is not made to be high.

There are cases in which the user operates the CG model by his or her own hand in MR. In such a case, it is necessary to model the hand of the user from a stereo camera and a depth sensor, and make a high-speed determination as to contact while expressing the anteroposterior relationship of the modeled hand and the CG model. Here, by overlapping the live action hand image on the display position when the modeled hand is displayed, the user feels as though he or she is operating the CG model with his or her actual hand.

Meanwhile, if a visible deviation in the real video occurs when the shape of the modeled hand and the actual hand differ, it will leave the user with a sense of unnaturalness. Also, in the case of modeling only the object surface by using a distance measurement apparatus that is attached to the HMD, there is a problem in that it is impossible to consider thickness, and so the determination as to contact with the CG model cannot be performed properly, and it will leave the user with a sense of unnaturalness.

SUMMARY OF THE INVENTION

The present invention was conceived in view of these problems, and provides a technique for a user to naturally operate CG.

According to one aspect, the present invention provides an information processing apparatus that communicates with a display device that has an image capturing unit and that generates an image to be displayed on the display device, the information processing apparatus comprising an image acquisition unit configured to acquire an image captured by the image capturing unit; a setting unit configured to set information related to a thickness of an operation unit that a user operates, a surface model generating unit configured to detect an area in which the operation unit is present in the image acquired by the image acquisition unit, and to generate a surface model of the operation unit that is visible from the image capturing unit based on the area, a thickness model generating unit configured, based on the information related to the thickness set by the setting unit, to generate a thickness model that has a thickness from the surface model, and an image generating unit configured to perform a determination as to a contact with a CG object based on the thickness model generated by the thickness model generating unit, and to generate an image to be displayed on the display device.

By virtue of the present invention, a user is enabled to naturally operate CG.

Further features of the present invention will become apparent from the following description of exemplary embodiments (with reference to the attached drawings).

DESCRIPTION OF THE EMBODIMENTS

Explanation in detail is given below for an embodiment according to the present invention, in accordance with the drawings.

<Apparatus Configuration>

Figure 1:
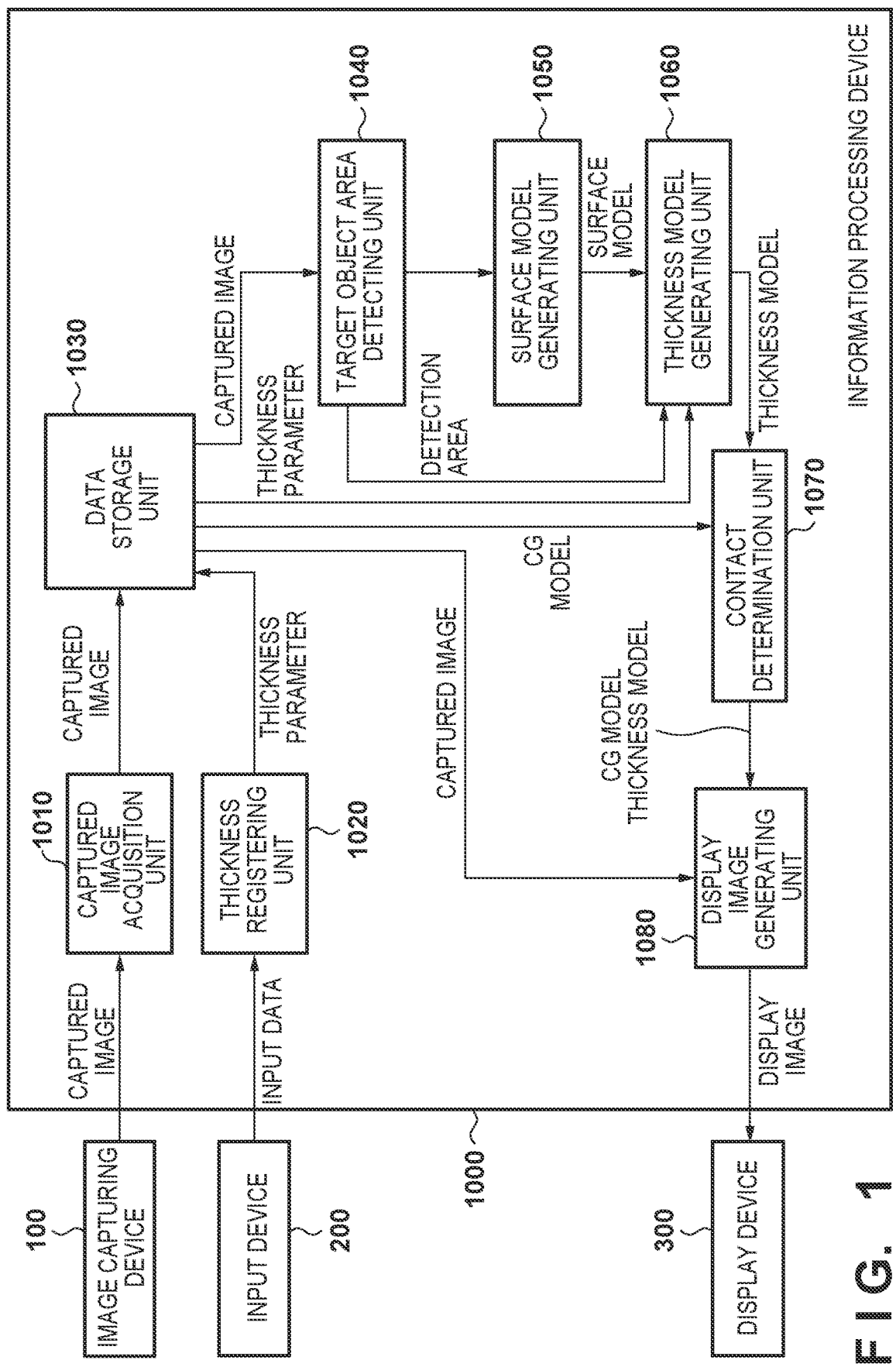
FIG. 1 is a system configuration diagram in a first embodiment.

A block diagram of an information processing device for controlling an image capturing device according to the present embodiment is illustrated in FIG. 1. In the present embodiment, an image capturing device 100, an input device 200, and a display device 300 are configured to be connected to an information processing device 1000. However, the image capturing device 100 is given a stereo configuration. For example, the image capturing device 100 is image capturing cameras arranged on a video see-through type HMD (Head Mounted Display) and the display device 300 is a display such as an HMD or a PC monitor. Also, although it is assumed that detection of the position and orientation of the HMD is performed based on markers (types and positions of markers being known) appearing within an image that an image capturing device of the HMD captured, the method of detecting the position and orientation of the HMD is not limited to this type.

Figure 9:
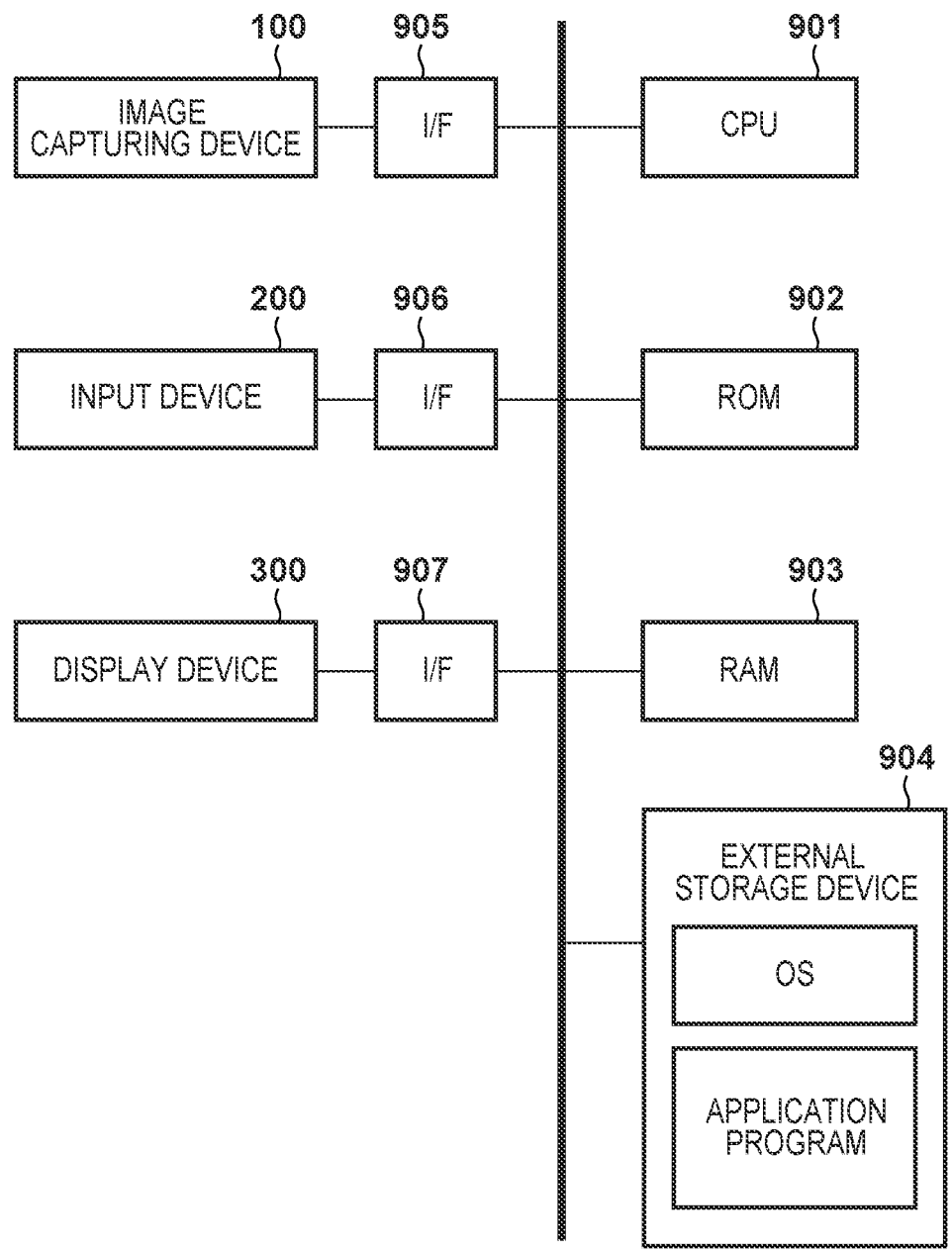
FIG. 9 is a view illustrating a hardware configuration of an information processing device in an embodiment.

The information processing device 1000 is a device as typified by a personal computer, or the like, and has a configuration illustrated in FIG. 9 as hardware. In other words, the information processing device 1000 has I/Fs 905 to 907 for connecting a CPU 901, a ROM 902, a RAM 903, and an external storage device 904 as well as the image capturing device 100, the input device 200, and the display device 300. The ROM 902 stores a BIOS and a boot program. The RAM 903 stores an operating system (OS) and the application in the embodiment, which the CPU 901 executes, and the RAM 903 is employed as a work area of the CPU 901. The external storage device 904 is typically a hard disk drive and stores an OS and applications. When a power supply of the information processing device 1000 is turned ON, the CPU 901 executes the boot program of the ROM 902, loads the OS from the external storage device 904 into the RAM 903 and executes it to thereby activate the OS. After this, the CPU 901 loads application programs from the external storage device 904 into the RAM 903, and executes them. As a result, the CPU 901 functions as a thickness registering unit 1020, a data storage unit 1030, a target object area detecting unit 1040, a surface model generating unit 1050, a thickness model generating unit 1060, a contact determination unit 1070, and a display image generating unit 1080 within the information processing device 1000. Note, configuration may be such that not all of these are realized by software and some are realized by hardware. Hereafter, a description is given of functions of each component. Note that hereinafter, the image capturing device 100 and the display device 300 are assumed to configure the HMD, and processing of the information processing device 1000 is described with reference to FIG. 1.

A captured image acquisition unit 1010 receives, from the HMD, an image captured by the image capturing device 100 equipped in the HMD and temporarily stores it to the data storage unit 1030. The thickness registering unit 1020 stores to the data storage unit 1030 information (a thickness parameter), inputted by the input unit 200, relating to the thickness of a modeled target object in the embodiment. The data storage unit 1030 is a memory area allocated in the RAM, for example. Note, the modeled target object is an operation unit that a user wearing the HMD operates and is specifically the hand of the user in the embodiment.

The target object area detecting unit 1040 reads the captured image stored in the data storage unit 1030 and detects an area of a real object (a hand in the embodiment) that is targeted for modelling and is present within the captured image. For example, a specific color area within the image may be detected by using a color dictionary for the real object and a target object area may be detected by machine learning. As long as the real object area can be detected from the captured image, the method for detection is not limited to this type.

The surface model generating unit 1050 generates a three-dimensional model from a detection area detected by the target object area detecting unit 1040. For example, a three-dimensional polygon model of the target is generated by obtaining and stereo matching corresponding points on an outline of the detection area of stereoscopic images. Note, the three-dimensional model generated by the stereo matching is merely a thin surface model that does not have a thickness from a perspective of a line of sight direction of the image capturing device. However, when the three-dimensional model is projected onto the captured image, it is aligned with the detection area.

The thickness model generating unit 1060 adds a thickness in accordance with the thickness parameter registered in the data storage unit 1030 so as to not change the appearance when the surface model generated by the surface model generating unit 1050 is projected onto the captured image. In other words, the thickness model generating unit 1060 generates, from the three-dimensional shape of the surface that lacks thickness, a model as a "thing" that has depth and that can simply be seen from the image capturing device 100.

The contact determination unit 1070 makes a determination as to contact between the thickness model generated by the thickness model generating unit 1060 and a CG model stored in the data storage unit. Contact determination may be of any determination method such as a bounding volume hierarchical structure or a GJK method. When a contact determination is made, a collision response may be performed on the CG model so that models do not sink into each other, and an operation (such as movement processing) on the CG model may be performed triggered by the contact.

The display image generating unit 1080 performs image generation processing for overlapping the CG model and the thickness model calculated by the contact determination unit 1070 and the captured image stored in the data storage unit 1030, and outputs a display of the generated image on the display device 300. At that time, the captured image is first drawn in the background, then a transparent thickness model is rendered by enabling a depth test, and finally, by rendering the CG model, it is possible to overlap an image of the real object on a position in the thickness model.

<Processing Procedure>

Figure 2:
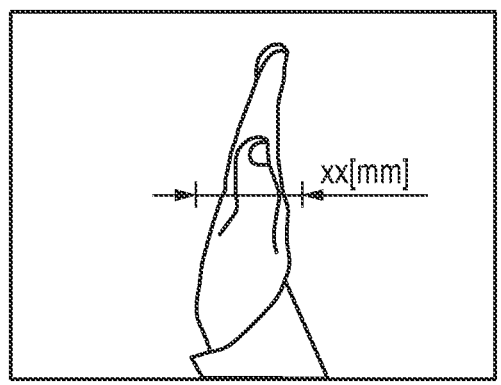
FIG. 2 is a view illustrating a registration method of a thickness registering unit in the first embodiment.

A feature of the present embodiment is that there are two processes (1): that of the thickness registering unit 1020 and (2) that of the thickness model generating unit. The thickness registering unit 1020 takes the thickness of the model that is the target as input from a User Interface (UI). Regarding registration of the thickness, the thickness of the model may be inputted by a keyboard or a mouse, or the target real object may be captured by a stereo camera and the thickness automatically inputted based on stereo matching. For example, the target real object may be captured as illustrated in FIG. 2, and the width in a horizontal direction of the surface model generated by the surface model generating unit 1050 may be made to be the thickness.

Figure 3:
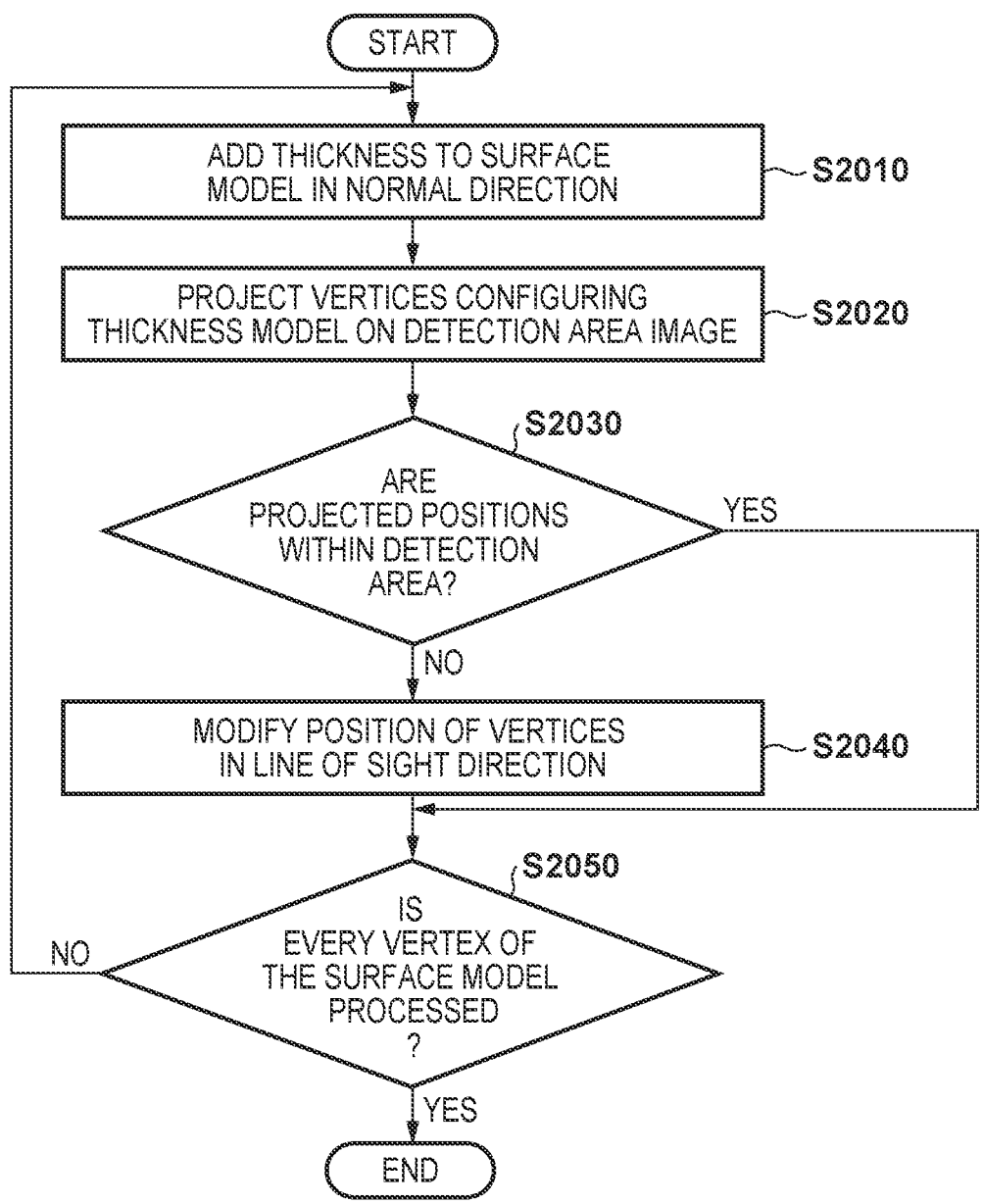
FIG. 3 is a flowchart illustrating a process of a thickness model generating unit in the first embodiment.
Figure 4:
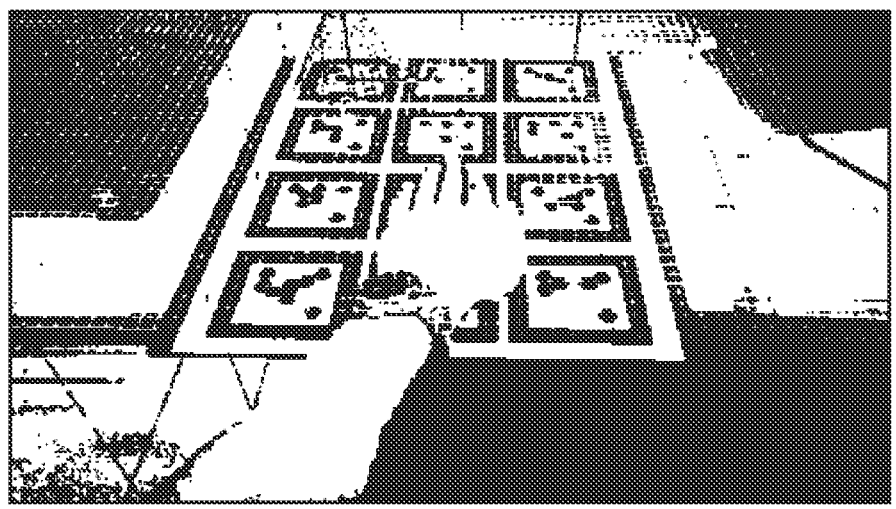
FIG. 4 is a view illustrating an example of an input image of a target object area detecting unit in the first embodiment.
Figure 5:
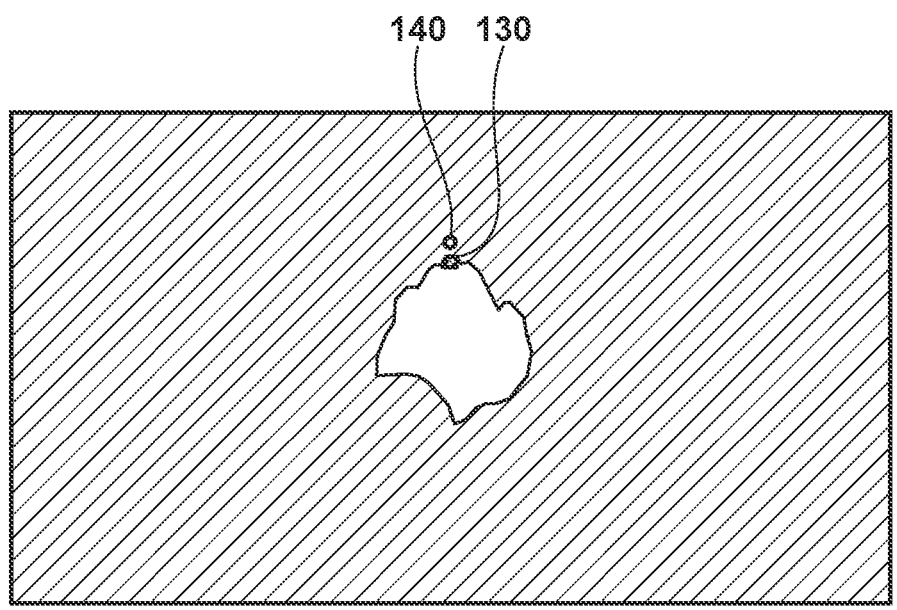
FIG. 5 is a view illustrating an example of an output image of a target object area detecting unit in the first embodiment.

FIG. 3 is a flow diagram for illustrating a flow of processing of the surface model generating unit 1050 of the embodiment. Also, FIG. 4 illustrates a captured image, and FIG. 5 illustrates an area image that the target object area detecting unit 1040 detected and generated.

Figure 6:
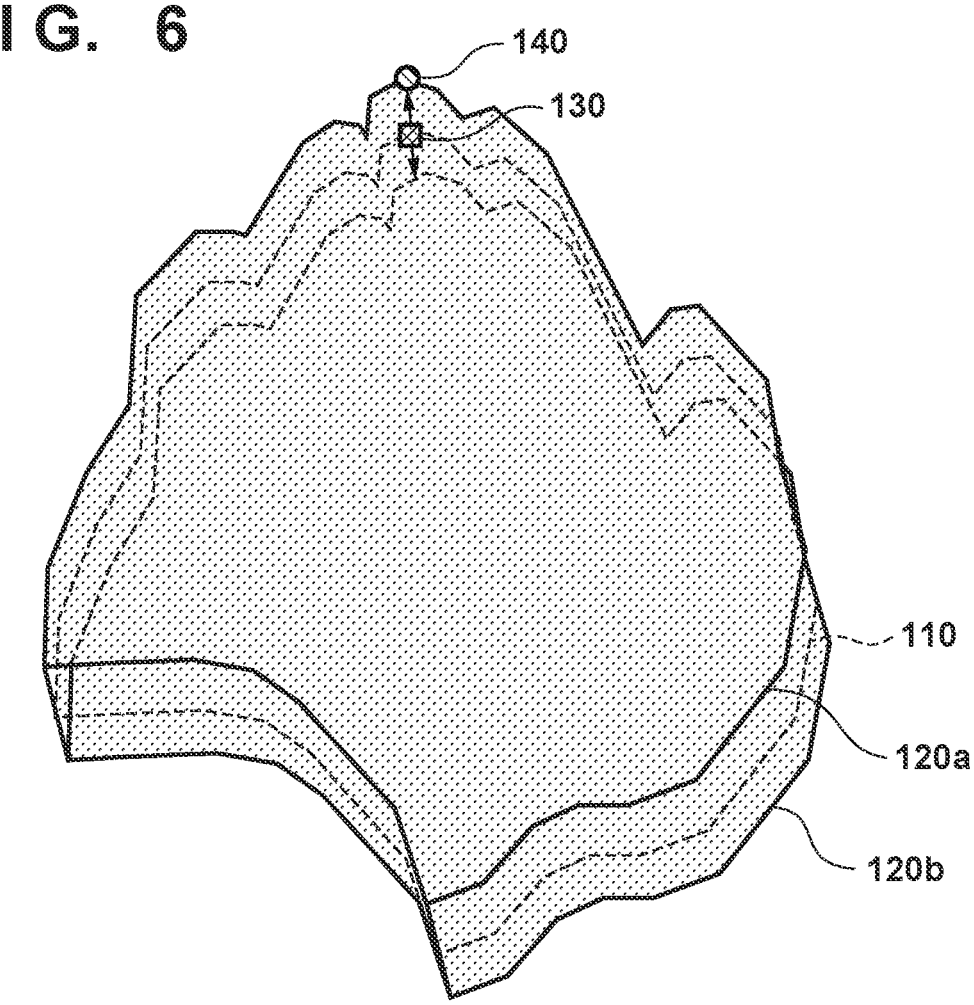
FIG. 6 is a view illustrating a model to which thickness was added in a normal direction in the thickness model generating unit in the first embodiment.

In step S2010, the surface model generating unit 1050 calculates the normal of a vertex configuring the generated surface model 110 (in the embodiment, this vertex is the point positioned highest in a vertical direction in the area that the target object area detecting unit 1040 detected). Next, the surface model generating unit 1050, as illustrated in FIG. 6, based on the thickness parameter, generates new vertices in the positive/negative direction of the normal, and generates an upper-surface model 120a and a lower-surface model 120b. Furthermore, the surface model generating unit 1050 generates a side surface model after generating the upper-surface model 120a and the lower-surface model 120b. The side surface model can be expressed by combining polygons in which the corresponding vertices of the upper-surface model 120a and the lower-surface model 120b and an adjacent vertex obtained from the outline of the surface model 110 are made to be the three vertices. The thickness model can be defined by the upper-surface model 120a, the lower-surface model 120b, and the side surface model.

In step S2020, the surface model generating unit 1050 projects each vertex of the thickness model generated in step S2010 onto the detection area image generated in the target object area detecting unit 1040.

Then, in step S2030, the surface model generating unit 1050 determines whether each vertex is inside of or outside of the detection area image. For example, when the vertex 140 of FIG. 6 is projected, it is evaluated that the position of the vertex 140 of FIG. 5 is outside of the detection area.

Figure 7:
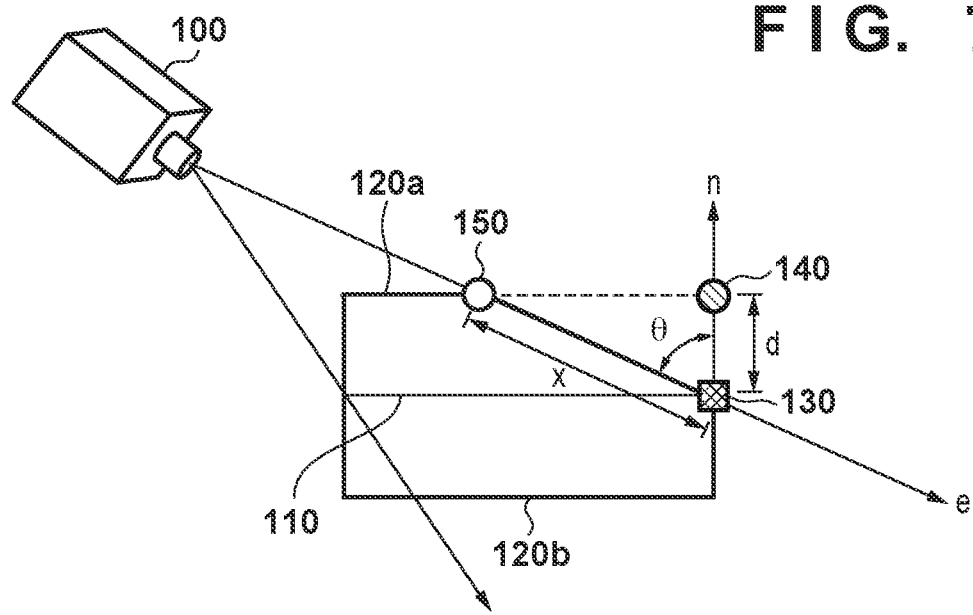
FIG. 7 is a view illustrating a modified position of a vertex in the thickness model generating unit in the first embodiment.

Finally, in a case when it is outside of the detection area image, the surface model generating unit 1050, in step S2040, deforms the thickness model by moving the vertex 140 on the line of sight as illustrated in FIG. 7. Here, the vertex after the movement is reference numeral 150. For example, when the normal of the vertex 140 is n, the line of sight direction is e, and the thickness is d[mm], the amount of movement of the vertex is x[mm] in the reverse direction to the line of sight. The method for calculating the amount of movement x is illustrated in the following expression (1).

$$x = \frac{d}{\cos\theta} = \frac{d}{n \cdot (-e)} \quad (1)$$

<First Variation>

In the above described embodiment, the thickness of the real object is inputted in the thickness registering unit 1020, but a volume may be registered in place of the thickness. For example, the volume of the model may be inputted from a keyboard or a mouse, and the volume of the model may be calculated by performing a three dimensional reconstruction of the target real object by using a camera.

The thickness model generating unit 1060 in the embodiment added thickness in the normal direction according to the inputted thickness, but, in the first variation, the thickness amount is dynamically calculated so as to achieve the set volume. The volume of the thickness model can be calculated by the following expression (2) according to Gauss' divergence theorem.

$$\int_V \mathrm{div} A\, dV = \int_S A \cdot ds \quad (2)$$

Here, V is the volume of the model, S is the surface area of the model, and A is an arbitrary vector. Since A is an arbitrary vector, when divA=1 (for example, A=(x, 0, 0)), it results in the following expression (3).

$$V = \int_S A \cdot dS \quad (3)$$

Here, when the vertices of the polygon i that configures the thickness model are vi1, vi2, and vi3, dS is represented by the following expression (4).

$$dS = (v^i_2 - v^i_1) \times (v^i_3 - v^i_1) \quad (4)$$

By Expressions (3) and (4), the volume of the thickness model can be approximated by the following expression (5).

$$V = \sum_{i=0}^{N} A \cdot (v^i_2 - v^i_1) \times (v^i_3 - v^i_1) \quad (5)$$

Next, so that the volume becomes the set value, the vertices are moved. For example, the vertices may be dynamically moved by a pressure model. The pressure model is treated as something containing air inside of the thickness model, and it is deformed according to changes in pressure that depend on changes in volume.

For example, when the current volume is V and the set volume is V', by Boyle's Law and Charles' Law, the following expression (6) holds.

$$\frac{pV}{T} = \frac{p'T'}{T'} \quad (6)$$

Here, T is the current air temperature, p is the current pressure, T' is the temperature of air in the set volume, and p' is the pressure in the set volume. If the temperatures of the air before/after the deformation are the same, the following expression (7) holds, and the pressure of the air can be obtained from the volume.

$$pV=p'V' \quad (7)$$

Figure 8:
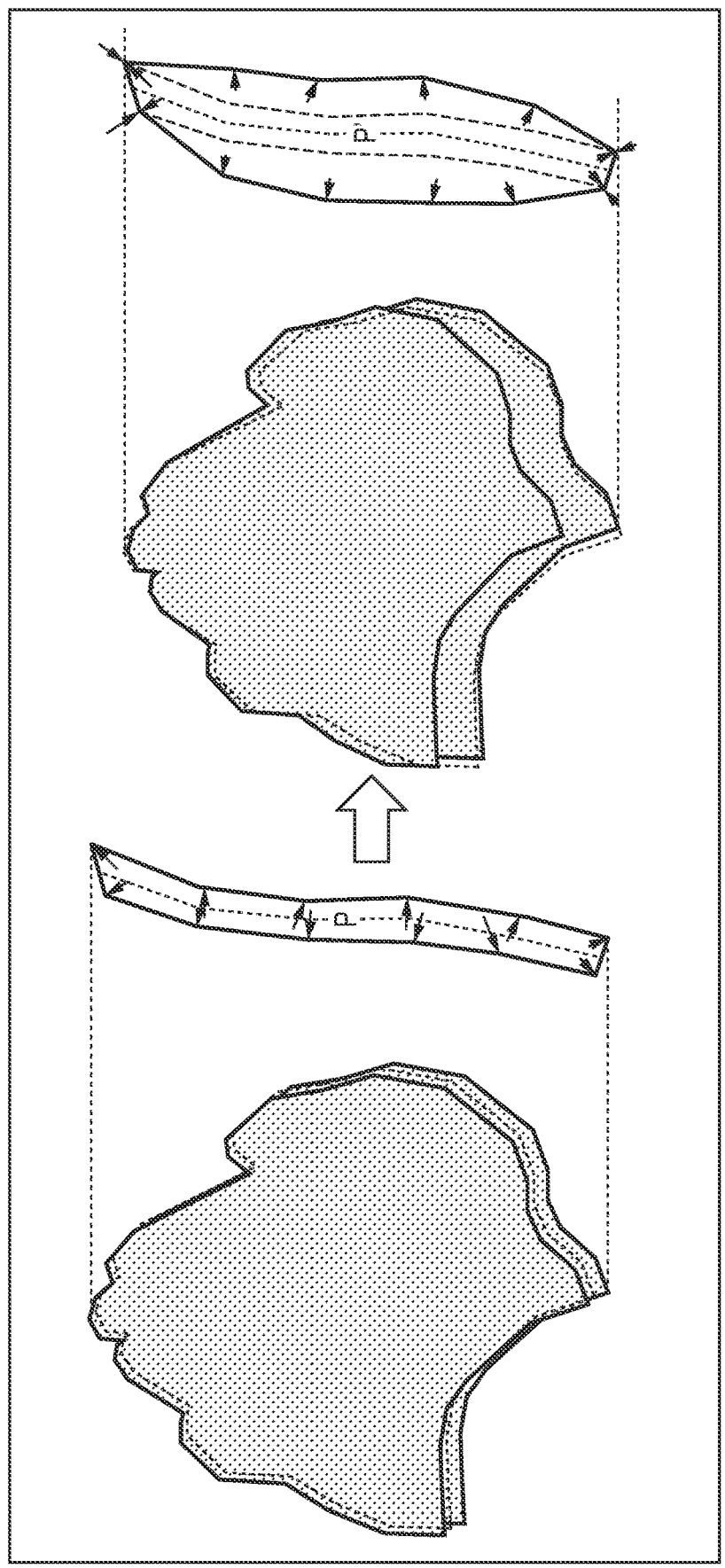
FIG. 8 is a view illustrating a relationship of a thickness model and pressure in a variation.

Also, considering a state in which internal pressure and external pressure are in equilibrium in the volume V', the external pressure is p' and the internal/external pressure difference is p−p'. Here, because the pressure is stress per unit area, the thickness model deforms when a force is added to a vertex configuring a polygon in accordance with the area of the polygon. A relationship between the thickness model and the pressure is illustrated in FIG. 8. When the volume of the thickness model is small, vertices of the thickness model expand to the outside by large internal pressure, and the internal pressure becomes smaller as the set volume is approached, and the change in the volume becomes smaller.

In this way, it is possible to make the volume fixed by repeating a similar calculation until the thickness model becomes the set volume.

Note that it is possible to configure so that the model does not protrude from the detection area image by applying a force according to the size of the protrusion in a direction orthogonal to the line of sight direction in the case when a vertex is outside of the detection area.

As described above, by virtue of the embodiment, since a thickness model is obtained from the surface model of a hand of the user, and an image is generated by making a determination as to a collision with a CG object by using that thickness model, it becomes possible to generate an image that tends not to cause a sense of unnaturalness.

Note that, in the embodiment, a description is given using the HMD as an example of a display device for the user, but a display device with a camera, such as a smartphone or a tablet, for example, may be employed, and, therefore, the invention of the present application is not limited to the above-described embodiment.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus that communicates with a display device that has an image capturing unit and that generates, as an image to be displayed on the display device, a composed image in which a computer graphics (CG) object in a virtual space according to the position and orientation of the image capturing unit is overlaid on a portion of an original image, in real space, captured by the image capturing unit, the information processing apparatus comprising:

at least one processor operatively coupled to a memory, serving as:
(a) an image acquisition unit configured to acquire an original image captured by the image capturing unit;
(b) a setting unit configured to set information related to a thickness of an operation unit that a user operates in the real space;
(c) a surface model generating unit configured to detect an area in which the operation unit is present in the original image acquired by the image acquisition unit, and to generate a surface model of the operation unit that is visible from the image capturing unit based on the area;
(d) a thickness model generating unit configured, based on the information related to the thickness set by the setting unit, to generate a thickness model that has a thickness from the surface model, wherein the thickness model generating unit comprises a deforming unit configured to deform the thickness model so that the thickness model does not protrude outside of an area that the operation unit, detected from the original image in the real space, indicates when the thickness model is projected onto the area, and the deforming unit deforms, in a line of sight direction of the image capturing unit, an area of the model that is outside of the area; and
(e) an image generating unit configured to perform a contact determination between the CG object in the virtual space and the operation unit in the real space based on the thickness model generated by the thickness model generating unit, and to generate, as the image to be displayed on the display device, the composed image to which the result of the contact determination is reflected.

2. The apparatus according to claim 1, wherein the thickness model generating unit comprises a thickness adding unit configured to add thickness in a normal direction to the surface model.

3. The apparatus according to claim 1, wherein the thickness model generating unit has a computing unit configured to compute a thickness from a volume.

4. The apparatus according to claim 1, wherein the thickness model generating unit has a computing unit configured to compute a thickness from an original image obtained by capturing the operation unit.

5. The apparatus according to claim 1, wherein the display unit is a head mounted display (HMD).

6. The apparatus according to claim 5, wherein the apparatus is a part of a system that presents, to a user wearing the HMD, the composed image in which the CG object is overlaid to the image captured by the image capturing unit in real time.

7. The apparatus according to claim 1, wherein the operation unit is a hand of the user.

8. A method of controlling an information processing apparatus that communicates with a display device that has an image capturing unit and that generates, as an image to be displayed on the display device, a composed image in which a computer graphics (CG) object in a virtual space according to the position and orientation of the image capturing unit is overlaid on a portion of an original image, in real space, captured by the image capturing unit, the method comprising:

acquiring an original image captured by the image capturing unit;

setting information related to a thickness of an operation unit that a user operates in the real space;

detecting an area in which the operation unit is present in the acquired original image, and generating a surface model of the operation unit that is visible from the image capturing unit based on the area;

generating a thickness model that has a thickness from the surface model based on the information related to the set thickness, wherein the generating of the thickness model comprises deforming the thickness model so that the thickness model does not protrude outside of an area that the operation unit, detected from the original image in the real space, indicates when the thickness model is projected onto the area, and the deforming the thickness model deforms, in a line of sight direction of the image capturing unit, an area of the model that is outside of the area; and performing a contact determination between the CG object in the virtual space and the operation unit in the real space based on the generated thickness model, and generating, as the image to be displayed on the display device, the composed image to which the result of the contact determination is reflected reflected.

9. A non-transitory computer-readable storage medium storing a program which, when read and executed by a computer, causes the computer to perform steps in a method of controlling an information processing device that communicates with a display device that has an image capturing unit and that generates, as an image to be displayed on the display device, a composed image in which a computer graphics (CG) object in a virtual space according to the position and orientation of the image capturing unit is overlaid on a portion of an original image, in real space, captured by the image capturing unit, the method comprising:

acquiring an original image captured by the image capturing unit;

setting information related to a thickness of an operation unit that a user operates in the real space;

detecting an area in which the operation unit is present in the acquired original image, and generating a surface model of the operation unit that is visible from the image capturing unit based on the area;

generating a thickness model that has a thickness from the surface model, based on the information related to the set thickness, wherein the generating of the thickness model comprises deforming the thickness model so that the thickness model does not protrude outside of an area that the operation unit, detected from the original image in the real space, indicates when the thickness model is projected onto the area, and the deforming the thickness model deforms, in a line of sight direction of the image capturing unit, an area of the model that is outside of the area;

and performing a contact determination between the CG object in the virtual space and the operation unit in the real space based on the generated thickness model, and generating, as the image to be displayed on the display device, the composed image to which the result of the contact determination is reflected.

* * * * *